(12) United States Patent
Cheng et al.

(10) Patent No.: US 10,836,853 B2
(45) Date of Patent: *Nov. 17, 2020

(54) CRACK-RESISTANT POLYETHYLENE COMPOSITIONS

(71) Applicant: ExxonMobil Chemical Patents Inc., Baytown, TX (US)

(72) Inventors: Jianya Cheng, Kingwood, TX (US); Pradeep P. Shirodkar, Houston, TX (US); Peijun Jiang, League City, TX (US); Andrew Takacs, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/596,468

(22) Filed: Jan. 14, 2015

(65) Prior Publication Data

US 2015/0125645 A1    May 7, 2015

Related U.S. Application Data

(63) Continuation-in-part of application No. 13/623,242, filed on Sep. 20, 2012, now Pat. No. 9,580,533.
(Continued)

(51) Int. Cl.
*C08L 23/08* (2006.01)
*C08F 210/18* (2006.01)
(Continued)

(52) U.S. Cl.
CPC ............... *C08F 210/18* (2013.01); *C08J 5/18* (2013.01); *C08L 23/0815* (2013.01);
(Continued)

(58) Field of Classification Search
CPC ............... C08F 210/18; C08L 23/0815; C08L 23/0823; C08L 23/083; C08L 2207/07
See application file for complete search history.

(56) References Cited

U.S. PATENT DOCUMENTS 3,261,889 A    7/1966  Wout
4,533,578 A    8/1985  Boyd et al.
(Continued)

FOREIGN PATENT DOCUMENTS

WO    2001/53364       7/2001
WO    WO 0162808 A1 *  8/2001 ............ C08F 210/02
(Continued)

OTHER PUBLICATIONS

Schut, "Foamed Films Find New Niches," Plastics Technology Online, Feb. 2002, pp. 48-55.
(Continued)

*Primary Examiner* — Ling Siu Choi
*Assistant Examiner* — David L Miller
(74) *Attorney, Agent, or Firm* — ExxonMobil Chemical Patents Inc.—Law Department

(57) ABSTRACT

A crack-resistant article comprising a diene terpolymer, the diene terpolymer comprising (or consisting essentially of) from 0.01 wt % to 10.0 wt % diene derived units, and 1.0 wt % to 20 wt % of $C_4$ to $C_{10}$ α-olefin derived units based on the weight of the diene terpolymer, wherein the diene terpolymer: a) has a $g'_{vis}$ of less than 0.90; b) has an Mw within a range of from 100,000 g/mol to 500,000 g/mol; c) has an Mw/Mn within the range of from 3.5 to 12.0; and d) an Mz/Mn of greater than 7.0. Inventive articles comprise a blend of a relatively high density linear polyethylene and the diene terpolymer.

19 Claims, 3 Drawing Sheets

Related U.S. Application Data

(60) Provisional application No. 61/933,453, filed on Jan. 30, 2014.

(51) Int. Cl.
  *C08J 5/18* (2006.01)
  *C08F 4/659* (2006.01)

(52) U.S. Cl.
  CPC ......... *C08F 4/65908* (2013.01); *C08L 23/083* (2013.01); *C08L 23/0823* (2013.01); *C08L 2203/16* (2013.01); *C08L 2205/025* (2013.01); *C08L 2207/07* (2013.01); *C08L 2314/06* (2013.01); *Y10T 428/139* (2015.01)

(56) References Cited

U.S. PATENT DOCUMENTS

| | | | |
|---|---|---|---|
| 4,657,811 A | 4/1987 | Boyd et al. | |
| 5,670,595 A | 9/1997 | Meka et al. | |
| 6,114,457 A | 9/2000 | Markel et al. | |
| 6,147,180 A | 11/2000 | Markel et al. | |
| 6,300,451 B1 | 10/2001 | Mehta et al. | |
| 6,355,757 B2 | 3/2002 | Garcia-Franco et al. | |
| 6,391,998 B1 | 5/2002 | Garcia-Franco et al. | |
| 6,417,281 B1 | 7/2002 | Garcia-Franco et al. | |
| 6,433,090 B1 * | 8/2002 | Ellul | C08L 23/16 525/191 |
| 6,509,431 B1 | 1/2003 | Duttweiler et al. | |
| 6,734,265 B1 | 5/2004 | Dekmezian et al. | |
| 6,870,010 B1 | 3/2005 | Lue et al. | |
| 7,687,580 B2 | 3/2010 | Lohse et al. | |
| 8,512,837 B2 | 8/2013 | Barreneche | |
| 9,321,911 B2 * | 4/2016 | Shirodkar | C08L 23/06 |
| 9,340,664 B2 * | 5/2016 | Shirodkar | C08L 23/06 |
| 2002/0128390 A1 * | 9/2002 | Ellul | C08L 23/10 525/191 |
| 2003/0139530 A1 * | 7/2003 | Starita | C08L 23/16 525/240 |
| 2003/0187083 A1 | 10/2003 | Harris | |
| 2004/0118592 A1 * | 6/2004 | Pehlert | C08L 23/0815 174/110 R |
| 2007/0260016 A1 * | 11/2007 | Best | B32B 27/32 525/240 |
| 2008/0138593 A1 | 6/2008 | Martinez | |
| 2008/0153997 A1 | 6/2008 | Casty et al. | |
| 2009/0197029 A1 | 8/2009 | Iyer et al. | |
| 2010/0092709 A1 | 4/2010 | Joseph | |
| 2013/0090433 A1 * | 4/2013 | Jiang | C08F 236/20 525/232 |
| 2013/0209774 A1 | 8/2013 | Shirodkar et al. | |
| 2013/0216812 A1 | 8/2013 | Cheng et al. | |
| 2013/0224463 A1 | 8/2013 | Shirodkar et al. | |
| 2015/0125645 A1 | 5/2015 | Cheng et al. | |
| 2015/0126634 A1 | 5/2015 | Shirodkar et al. | |
| 2016/0272798 A1 | 9/2016 | Cheng et al. | |

FOREIGN PATENT DOCUMENTS

| | | | |
|---|---|---|---|
| WO | 2002/085954 | 10/2002 | |
| WO | 2007/067307 | 6/2007 | |
| WO | 2007/136494 | 11/2007 | |
| WO | 2007/136494 A | 11/2007 | |
| WO | 2013/043796 | 3/2013 | |
| WO | WO-2014046777 A1 * | 3/2014 | C08L 23/04 |

OTHER PUBLICATIONS

Guzmán, Job D. et al., "Simple Model to Predict Gel Formation in Olefin-Diene Copolymerizations Catalyzed by Constrained-Geometry Complexes," AIChE Journal, 2010, 56(5), pp. 1325-1333.

Liu, Han-Tai et al., "Bimodal polyethylene products from UNIPOL™ single gas phase reactor using engineered catalysts," Macromolecular Symposia, 2003, vol. 195, pp. 309-316.

* cited by examiner

US 10,836,853 B2

CRACK-RESISTANT POLYETHYLENE COMPOSITIONS

CROSS-REFERENCE TO RELATED APPLICATIONS

This invention claims priority to U.S. Ser. No. 61/933,453, filed Jan. 30, 2014; and is a Continuation-in-Part to U.S. Ser. No. 13/623,242 filed Sep. 20, 2012 (which claims the benefit of U.S. Ser. No. 61/538,703 filed Sep. 23, 2011), both of which are herein incorporated by reference.

FIELD OF THE INVENTION

The present invention relates to diene terpolymers, and polyethylene compositions useful in geomembranes and other crack-resistant articles comprising linear polyethylenes and diene terpolymers.

BACKGROUND

Geomembranes are very low permeability synthetic membranes, liner or barrier typically used to control fluid (or gas) migration in a human-made project, structure, or system. Geomembranes are made from relatively thin continuous polymeric sheets, but they can also be made from the impregnation of geotextiles with asphalt, elastomer, or polymer sprays or as multilayered bitumen geocomposites. Geomembranes tend to be large film structures. They can be made by blown or cast film processes and the films tend to be relatively thick, so in the melt state of the blown film process they need sufficient melt strength to be commercially viable. A higher density (>0.925 g/cm$^3$) product is generally more desirable for high tensile strength, but crack resistance is also an important property, which usually drops at high density. The stress cracking resistance is inversely proportional to the density, which is demonstrated for instance in the plot in FIG. 2. The inventors have found that they can increase the melt strength of the base polyethylene resin, typically used in geomembranes, using a unique diene terpolymer. The inventors have found is that the addition of the additive improves both melt strength and crack resistance.

Publications of interest include: U.S. Pat. Nos. 8,512,837; 7,687,580; 6,509,431; 6,355,757; 6,391,998; 6,417,281; 6,300,451 U.S. Pat. Nos. 6,114,457; 6,734,265; 6,147,180; 6,870,010; 5,670,595; 4,657,811; 4,533,578; WO 2007/067307; WO 2002/085954; WO 2013/043796; US 2007/0260016; US 2010/092709; US 2013/0090433; US 2013/209774; US 2013/224463; US 2013/216812; Guzman, et al. in 56(5) AIChE Journal, 1325-1333 (2010); and "Bimodal polyethylene products from UNIPOL™ single gas phase reactor using engineered catalysts," Liu et al. in 195 MACROMOLECULAR SYMPOSIA, (2003).

SUMMARY

The present invention is directed to a crack-resistant article comprising a diene terpolymer ("DTP"), the diene terpolymer comprising (or consisting essentially of) from 0.01 wt % to 10.0 wt % diene derived units, and 1.0 wt % to 20 wt % of C$_4$ to C$_{10}$ α-olefin derived units based on the weight of the diene terpolymer, wherein the diene terpolymer: a) has a g'$_{vis}$ of less than 0.90; b) has an Mw within a range of from 100,000 g/mol to 500,000 g/mol; c) has an Mw/Mn within the range of from 3.5 to 12.0; and d) has an Mz/Mn of greater than 7.0. Inventive articles comprise (or consist essentially of) a blend of a linear polyethylene and the DTP. Exemplary articles include geomembranes, pipes, as well as other molded and thermoformed components and/or goods.

DETAILED DESCRIPTION

Figure 1:
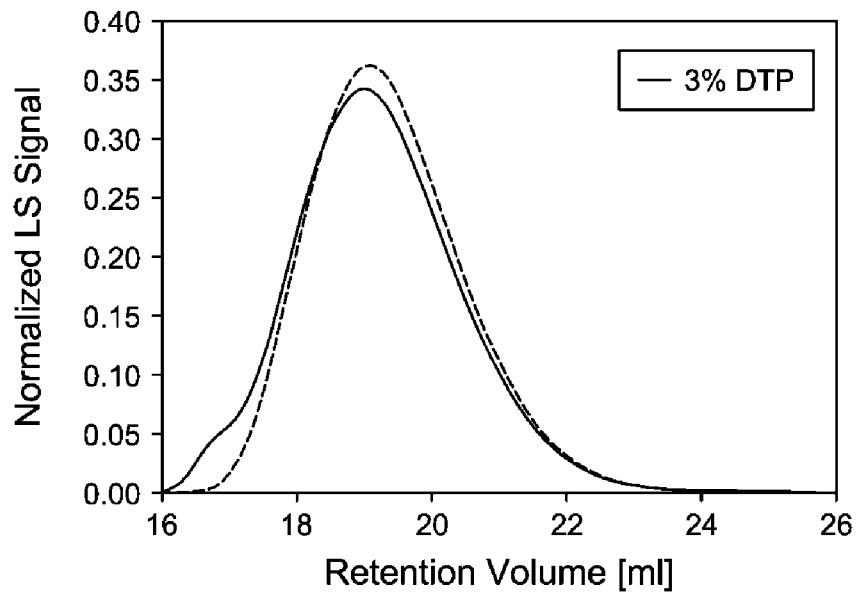
FIG. 1 is a graphical representation of GPC curves for a blend of 3 wt % of the branched modifier (or "diene terpolymer" ("DTP")) and Enable 3505™ and neat Enable 3505 (dotted line), a "linear polyethylene" having a g'$_{vis}$ of greater than 0.90.

This invention relates to a polyethylene-based, highly branched polyethylene diene terpolymer ("DTP") useful in blends with other polyolefins, especially so called "linear polyethylene" polymers, described further below, to form high stress-crack resistant articles with improved melt strength. The DTP can be described by a number of features and properties as measured. It primarily is comprised of ethylene derived units, but will also comprise from 1.0 or 2.0 or 5.0 wt % to 12 or 16 or 20 wt % of a C$_4$ to C$_{10}$ α-olefin derived units based on the weight of the DTP, most preferably 1-butene, 1-hexene or 1-octene. The DTP also comprises from 0.01 or 0.05 or 1.0 wt % to 1.5 or 2.0 or 5.0 or 8.0 or 10.0 wt % diene derived units, preferably alpha-omega dienes, based on the weight of the DTP. In a further aspect, the DTP can include at least 50 mol %, at least 70 mol %, at least 80 mol %, or at least 90 mol % of units derived from ethylene. In another aspect, the DTP can have a melting point temperature ($T_m$) of about 97.7° C. to about 110.7° C.

The dienes are most preferably selected from the group consisting of 1,4-pentadiene, 1,5-hexadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, tetrahydroindene, norbornadiene also known as bicyclo-(2.2.1)-hepta-2,5-diene, dicyclopentadiene, 5-vinyl-2-norbornene, 1,4-cyclohexadiene, 1,5-cyclooctadiene, 1,7-cyclododecadiene, and combinations thereof. The DTP preferably has a density within the range of from 0.890 or 0.905 or 0.910 or 0.915 g/cm$^3$ to 0.920 or 0.925 g/cm$^3$.

The properties of the DTP can of course vary depending on the exact process used to make it, but preferably the DTP has the following measurable features. Certain DSC measurable properties include the following: The DTP preferably has a melting point temperature ($T_m$) within the range of from 95 or 100° C. to 115 or 120 or 125 or 130 or 135° C. The DTP also preferably has a crystallization temperature (TO within the range of from 75 or 80 or 85° C. to 90° C. or 95 or 100 or 115 or 120 or 125° C. The DTP also preferably has a heat of fusion (Hf) within the range of from 80 or 90 or 100 or 110 or 120 J/g to 125 or 130 or 140 J/g.

Certain melt flow properties of the DTP include the following: The DTP preferably has a melt index (190/2.16, "$I_2$") of less than 5 or 4 or 3 or 2 or 1 or 0.5 g/10 min. The DTP has a wide ranging high load melt index ($I_{21}$), but preferably has a high load melt index (190/21.6, "$I_{21}$") of less than 10 or 8 or 6 or 4 or 2 or 1 g/10 min; or within the range of from 0.15 or 0.50 or 0.80 or 1.0 g/10 min to 1.5 or 4 or 5 or 6 or 8 or 10 g/10 min. The DTP has a melt index ratio (MIR, or $I_{21}/I_2$) within a range of from 20 or 25 or 30 to 70 or 75 or 80 or 85 or 90.

Certain dynamic properties of the DTP include the following: The DTP preferably has a Complex Viscosity at 0.1 rad/sec and a temperature of 190° C. within the range of from 20,000, or 50,000, or 100,000 or 150,000 P·s to 300,000 or 350,000 or 400,000 or 450,000 Pa·s. The DTP preferably has a Complex Viscosity at 100 rad/sec and a temperature of 190° C. within the range of from 500 or 700 P·s to 5,000 or 8,000 or 10,000 or 15,000 Pa·s. Also, the DTP preferably has a Phase Angle at the Complex Modulus of 10,000 Pa within the range of from 10 or 15 or 20 or 25° to 45 or 50 or 55 or 60° when the complex shear rheology is measured at a temperature of 190° C. The DTP preferably has a Phase Angle at the Complex Modulus of 100,000 Pa within the range of from 10 or 15° to 25 or 35 or 45° when the complex shear rheology is measured at a temperature of 190° C.

In preferred embodiments of the invention, the DTP has a level of branching indicated by the measured value of the branching index "$g'_{vis}$". The value for $g'_{vis}$ is preferably less than 0.95 or 0.92 or 0.90 or 0.80 or 0.75 or 0.60, or within a range of from 0.30 or 0.40 or 0.60 or 0.70 to 0.80 or 0.90 or 0.95. A polyethylene is "linear" when the polyethylene has no long chain branches, typically having a $g'_{vis}$ of 0.97 or above, preferably 0.98 or above. "Linear polyethylenes" preferably include ethylene polymers having a $g'_{vis}$ of 0.95 or 0.97 or more, and as further described herein. Thus, a lower value for $g'_{vis}$ indicates more branching. The inventive blends can however include blends of so-called long-chain branched LLDPEs with the DTP.

Shear thinning is observed for the DTPs and is a characteristic used to describe the diene terpolymer. "Shear thinning" is characterized by the decrease of the complex viscosity with increasing shear rate. One way to quantify the shear thinning is to use a ratio of complex viscosity at a frequency of 0.1 rad/s to the complex viscosity at a frequency of 100 rad/s. The "shear thinning ratio" is preferably greater than 10 or 20 or 30 or 40 or 50 for the DTPs used herein. More particularly, the shear thinning ratio of the DTP is within the range of from 5 or 10 or 20 to 40 or 50 or 60 or 70 or 100 or 200 or 300.

Certain GPC (Light Scattering (LS) or Differential Refractive Index (DRI)) measurable features include the following: The weight average molecular weight of the DTP, Mw, as measured by LS, is within a range of from 100,000 or 120,000 or 150,000 or 250,000 g/mol to 300,000 or 350,000 or 400,000 or 500,000 g/mol; and the z-average molecular weight, Mz, as measured by LS, is preferably greater than 600,000 or 800,000 or 1,000,000 or 1,500,000 g/mol, or most preferably within a range of from 500,000 or 600,000 or 800,000 or 1,000,000 g/mol to 1,500,000 or 1,500,000 or 2,000,000 or 2,500,000 or 3,000,000 g/mol; and a number average molecular weight, Mn, as measured by DR1, is within a range of from 10,000 or 20,000 g/mol to 25,000 or 30,000 or 40,000 or 50,000 g/mol. The Mw/Mn of the DTPs is preferably greater than 3.5 or 4.0 or 4.5 or 5.0 or 5.5 or 6.0 or 7.0, and is most preferably within a range of from 3.5 or 4.0 or 5.0 to 10 or 12; and the Mz/Mn is preferably greater than 7.0 or 10.0 or 15.0 or 20.0, or more, and most preferably within a range of from 7.0 or 10.0 or 15.0 or 20.0 to 30.0 or 35.0 or 40.0 or 50.0. For the DSC data, DRI (differential refractive index) method is preferred for Mn, while LS (light scattering) is preferred for Mw and Mz.

Preferably the DTP is gel-free. The presence of gel can be detected by dissolving the material in xylene at xylene's boiling temperature. The gel-free product should be dissolved in xylene. In one embodiment, the DTP has 5 wt % or less, preferably 4 wt % or less, preferably 3 wt % or less, preferably 2 wt % or less, preferably 1 wt % or less, or preferably 0 wt % of xylene insoluble material.

Making the Diene Terpolymer

The DTP can be made by techniques generally known in the art for making polyethylenes, and particularly as described in US 2013/0090433, especially solution, gas phase, or slurry phase polymerization processes using single-site catalysis. In particular, bridged tetrahydroindenyl zirconocenes or hafnocenes or substituted versions thereof are preferred single site catalysts when combined with known activator compounds such as perfluorinated organoboron compounds and/or aluminoxanes, most preferably methalumoxanes. As will be understood by those in the art, the identity of the catalyst and activator, their relative amounts, and the process conditions can be varied to effectuate the desired properties of the DTP as described above. Preferably, the catalyst composition is a bridged-bis(tetrahydroindenyl)zirconium dihalide or dialkyl, or bridged-bis(indenyl) zirconium dihalide or dialkyl, or substituted versions thereof, whereby the indenyl or tetrahydroindenyl chain may have $C_1$ to $C_{10}$ alkyl or phenyl substitutions at any one or more positions, especially the 2, 4 or 7 positions relative to the bridging position. The metallocenes are desirably activated with a so-called non-coordinating anion, preferably N,N-dialkyl anilinium tetrakis (perfluorinated aryl)borate, most preferably N,N-dimethyl anilinium tetrakis(heptafluoro-2-naphthyl)borate.

Desirable temperatures at which to carry out the slurry phase process to make the DTP is within the range of from 50 or 60° C. to 80 or 90 or 100 or 110° C. Hydrogen may be present in the slurry or solution process at a concentration of at least 50 ppm, or at least 100 ppm, or at least 150 ppm. Desirable temperature at which to carry out the solution phase processes to make the DTP is within the range of from 90 or 110° C. to 130 or 140 or 160 or 180° C. Finally, in either the slurry or solution process, desirable $C_4$ to $C_{10}$ α-olefin comonomer concentrations in the reactor are within the range of from 0.1 or 0.5 or 1 wt % to 2 or 5 or 10 or 15 wt %, and desirable diene feed rates are within the range of from 0.01 or 0.05 or 0.1 wt % relative to ethylene feed rate to 0.1 or 0.2 or 0.5 or 1.0 or 2.0 wt % relative to ethylene feed rate.

Articles Incorporating the Diene Terpolymer

The DTPs are particularly useful as modifiers of "linear polyethylenes" such as LLDPEs or long chain branched LLDPEs, that are used to form films and other articles. Preferably, highly branched low density polyethylene ("LDPE") is absent from the inventive blends. Examples of such linear polyethylenes include those such as disclosed in U.S. Pat. Nos. 8,399,581 and 7,951,873, and other traditional LLDPEs or so-called long-chain branched LLDPEs known in the art. The DTP improves the melt strength of the linear polyethylenes as well as its processability (e.g., as evidenced by increased output relative to LLDPE alone) and its Dart Impact and Tear Strength when made into films and other articles. Inventive compositions comprise, or preferably consist essentially of, or most preferably consist of a blend of linear polyethylene and the DTP. By "consist(ing)

essentially of" what is meant is that the blend may also include common additives such as antioxidants, anti-slip agents, colorants and pigments, and other common additives to a level no greater than 5 wt % or 4 wt % or 3 wt % or 2 wt %.

Preferably, additives such as block, antiblock, antioxidants, pigments, fillers, processing aids, UV stabilizers, neutralizers, lubricants, surfactants and/or nucleating agents may also be present. Preferred additives include silicon dioxide, titanium dioxide, polydimethylsiloxane, talc, dyes, wax, calcium stearate, carbon black, low molecular weight resins and glass beads, preferably these additives are present at from 0.1 or 1.0 ppm to 500 or 1000 ppm.

The DTPs are preferably present as a blend with the "linear polyethylenes" to form the articles within a range of from 0.1 or 0.2 or 0.5 or 1.0 to 4 or 6 or 8 wt % by weight of the blend. The blend is thus still considered unimodal in its GPC profile, but typically with a high molecular weight "bump" or "tail" as demonstrated in FIG. 1. Desirably, this high molecular weight region is that of the DTP and is highly branched.

The "linear polyethylenes" useful in the inventive articles have certain desirable features. In a preferred embodiment of the invention, the linear polyethylene has a $g'_{vis}$ of greater than 0.950 or 0.980; and a density within the range of from 0.925 or 0.930 g/cm$^3$ to 0.935 or 0.940 or 0.950 g/cm$^3$.

In a preferred embodiment of the invention, the linear polyethylene has an $I_2$ within the range of from 0.05 or 0.10 g/10 min to 1.0 or 2.0 g/10 min, and $I_{21}$ within the range of from 8 or 10 or 16 or 20 g/10 min to 24 or 28 or 32 or 36 g/10 min.

In a preferred embodiment of the invention, the linear polyethylene has an Mw/Mn within the range of from 3.0 or 3.5 to 4.5 or 5.0 or 6.0.

In a preferred embodiment of the invention, the linear polyethylene has an Mz (LS) within a range of from 150,000 or 200,000 or 250,000 g/mol to 300,000 or 350,000 or 400,000 or 450,000 or 500,000 or 800,000 g/mol.

In a preferred embodiment of the invention, the linear polyethylene has an Mw (LS) within a range of from 80,000 or 100,000 g/mol to 150,000 or 200,000 or 300,000 g/mol.

In a preferred embodiment of the invention, the linear polyethylene has a Heat of Fusion ($H_f$) within a range of from 140 or 150 or 160 or 165 J/g to 180 or 185 or 190 or 200 J/g. And finally, the linear polyethylene preferably has a melting point temperature within the range of from 118 or 120° C. to 126 or 128° C.

Preferably, the linear polyethylene/DTP blend has a melt strength that is at least 5% higher than the melt strength of linear polyethylene used in the blend, preferably at least 10%, more preferably at least 20%, or at least 30%, or at least 40%, or at least 50%, or at least 100%, or at least 200%, or at least 300%, or at least 400%. Desirably, the melt strength of the DTP is within the range of from 5 or 10 or 15 or 20 or 30 cN to 40 or 50 or 60 cN, while that of the inventive blends is within the range of from 5 or 10 or 15 cN to 20 or 25 or 30 or 35 or 40 cN.

The articles comprising the DTP have certain desirable features. Most notably, the articles are very crack resistant as indicated by the NCTL tests. Preferably, the inventive articles have a stress crack resistance (NCTL) of greater than 1800 or 1900 or 2000 or 2400 or 2800 or 3000 hours; or within a range of from 2000 or 2500 hours to 3500 or 4000 or 5000 hours.

The inventive articles have other features as well that are comparable or improved over other polyethylene articles. For instance, the articles preferably have a specific gravity within a range of from 0.930 to 0.950 g/cm$^3$. Preferred embodiments of the invention also have an Elongation at Break of greater than 500 or 600 or 700%; or within a range of from 500 or 600% to 900 or 1000%. Preferred embodiments of the invention also have a Strength at Yield of greater than 20 or 22 or 26 kN/m; or within a range of from 20 or 22 or 24 kN/m to 28 or 30 or 32 or 36 kN/m. Preferred embodiments of the invention also have a Tear Strength of greater than 200 or 210 or 220 N; or within a range of from 200 or 210 or 220 N to 240 or 260 or 300 or 360 N.

Many useful "articles", or articles of manufacture and components of such articles, can be made from the DTP. Most preferably the article is a geomembrane comprising (or consisting essentially of) the linear polyethylene and DTP. Other articles can be formed using the DTP, most preferably as a blend with the linear polyethylene, including pipe, large or thick films, high-speed films, molded, or thermoformed articles comprising (or consisting essentially of) the linear polyethylene and DTP.

The various descriptive elements and numerical ranges disclosed herein for the inventive articles incorporating the DTPs can be combined with other descriptive elements and numerical ranges to describe the invention; further, for a given element, any upper numerical limit can be combined with any lower numerical limit described herein. The features of the invention are demonstrated in the following non-limiting examples.

EXAMPLES

Test Methods

All test methods are well known in the art and published in US 2013/0090433 A1. The crystallization and melting point temperatures were determined by Differential Scanning Calorimetry at 10° C./min. The melt flow parameters are determined per ASTM D 1238 190° C., 21.6 kg. Polymer molecular weight (weight-average molecular weight, Mw, number-average molecular weight, Mn, and Z-averaged molecular weight, Mz) and molecular weight distribution (Mw/Mn) are determined using Size-Exclusion Chromatography. Equipment consists of a High Temperature Size Exclusion Chromatograph (either from Waters Corporation or Polymer Laboratories), with a differential refractive index detector (DRI), an online light scattering detector, and a viscometer (SEC-DRI-LS-VIS). For purposes of the claims, SEC-DRI-LS-VIS shall be used. Three Polymer Laboratories PLgel 10 mm Mixed-B columns are used. The nominal flow rate is 0.5 cm$^3$/min and the nominal injection volume is 300 µL. The various transfer lines, columns and differential refractometer (the DRI detector) are contained in an oven maintained at 135° C. Solvent for the SEC experiment is prepared by dissolving 6 grams of butylated hydroxy toluene as an antioxidant in 4 liters of reagent grade 1,2,4-trichlorobenzene (TCB). The TCB mixture is then filtered through a 0.7 µm glass pre-filter and subsequently through a 0.1 µm Teflon filter. The TCB is then degassed with an online degasser before entering the SEC.

For ethylene copolymers with alpha-omega-dienes, propylene, and 1-butene the presence of long chain branched structures in the branched modifier can be detected using nuclear magnetic resonance spectroscopy (NMR). In 13C-NMR, the modifiers are dissolved in tetrachloroethane-d2 at 140° C. and the spectra are collected at 125° C. Assignments of peaks for ethylene/propylene, ethylene/butene, ethylene/hexene, and ethylene/octene copolymers have been reviewed by James C. Randall in 29(2) POLYMER REVIEWS, 201-317, (1989). Assignments for propylene/butene, propylene/pentene, propylene/hexene, propylene/heptene, and propylene/octene are presented by U. M Wahner, et al., (240 MACROMOL. CHEM. PHYS. 1738-1748 (2003)). These assignments were made using hexamethyldisiloxane as the internal standard. To convert them to the same standard used in the other references, add 2.0 to the chemical shifts. Assignments and a method of measuring decene concentration have been reported for propylene/ethylene/decene terpolymers in Escher, Galland, and Ferreira (41 J. POLY. SCI., PART A: POLY. CHEM., 2531-2541 (2003)) and Ferreira, Galland, Damiani, and Villar (39 J. POLY. SCI, PART A: POLY. CHEM, 2005-2018, (2001)). The peaks in the $^{13}$C-NMR spectrum of ethylene/norbornadiene copolymers are assigned by Monkkonen and Pakkanen (200 MACROMOL. CHEM. PHYS., 2623-2628 (1999)) and Radhakrishnan and Sivaram (200 MACROMOL. CHEM. PHYS., 858-862 (1999)). More details are disclosed in US 2013/0090433 A1.

Solution Process DTP

DTPs in Examples 1 to 9 were made in a continuous stirred-tank reactor operated in a solution process. The reactor was a 0.5-liter stainless steel autoclave reactor and was equipped with a stirrer, a water cooling/steam heating element with a temperature controller and a pressure controller. Solvents and comonomers were first purified by passing through a three-column purification system. The purification system consisted of an Oxiclear column (Model # RGP-R1-500 from Labelear) followed by a 5 A and a 3 A molecular sieve column. Purification columns were regenerated periodically whenever there was evidence of lower activity of polymerization. Both the 3 A and 5 A molecular sieve columns were regenerated in-house under nitrogen at a set temperature of 260° C. and 315° C., respectively. The molecular sieve material was purchased from Aldrich. The Oxiclear™ column used in these studies were regenerated by the original manufacture. Ethylene was delivered as a gas solubilized in the chilled solvent/monomer mixture. The purified solvents and monomers were then chilled to −15° C. by passing through a chiller before being fed into the reactor through a manifold. Solvent and monomers were mixed in the manifold and fed into the reactor through a single tube. All liquid flow rates were measured using Brooksfield mass flow controller.

The metallocenes were pre-activated with an activator of N,N-dimethyl anilinium tetrakis(heptafluoro-2-naphthyl) borate at a molar ratio of 1:1 in toluene. The pre-activated catalyst solution was kept in an inert atmosphere with <1.5 ppm water content and was fed into the reactor by a metering pump through a separated line. Catalyst and monomer contacts took place in the reactor.

As an impurity scavenger, 200 ml of tri-n-octyl aluminum (TNOA) (25 wt % in hexane, Sigma Aldrich) was diluted in 22.83 kilogram of isohexane. The TNOA solution was stored in a 37.9-liter cylinder under nitrogen blanket. The solution was used for all polymerization runs until 90% of consumption, and then a new batch was prepared. The feed rates of the TNOA solution were adjusted in a range of from 0 (no scavenger) to 4 ml per minute to achieve a maximum catalyst activity.

The reactor was first prepared by continuously N2 purging at a maximum allowed temperature, then pumping isohexane and scavenger solution through the reactor system for at least one hour. Monomers and catalyst solutions were then fed into the reactor for polymerization. Once the activity was established and the system reached equilibrium, the reactor was lined out by continuing operation of the system under the established condition for a time period of at least five times of mean residence time prior to sample collection. The resulting mixture, containing mostly solvent, polymer and unreacted monomers, was collected in a collection box. The collected samples were first air-dried in a hood to evaporate most of the solvent, and then dried in a vacuum oven at a temperature of 90° C. for 12 hours. The vacuum oven dried samples were weighed to obtain yields. All the reactions were carried out at a pressure of 2 MPa.

1,9-decediene was diluted with isohexane and fed into the reactor using a metering pump. Both rac-ethylenebis(indenyl)zirconium dimethyl (catalyst A) and rac-dimethylsilyl-bis(indenyl)zirconium dimethyl (Catalyst B) were pre-activated with N,N-dimethyl anilinium tetrakis(heptafluoro-2-naphthyl)borate. The polymerization process condition and some characterization data are listed in Table 1. For each polymerization run, the catalyst feed rate and scavenger fed rate were adjusted to achieve a desired conversion listed in Table 1.

TABLE 1

DTP produced in a solution process

| | DTP No. | | | |
|---|---|---|---|---|
| | 1 | 2 | 3 | 4 |
| Catalyst | Catalyst A | Catalyst A | Catalyst A | Catalyst A |
| Reaction temperature (° C.) | 140 | 137 | 120 | 130 |
| Isohexane flow rate (g/min) | 52.24 | 52.24 | 52.24 | 52.24 |
| ethylene feed rate (slpm) | 8 | 8 | 8 | 8 |
| 1-hexene feed rate (g/min) | 3 | 3 | 3 | 3 |
| 1,9-decadiene feed rate (ml/min) | 0.0476 | 0.0488 | 0.024 | 0.0488 |
| Yield (gram/min) | 8.97 | 9.43 | 10.14 | 9.68 |
| Conversion (%) | 74.5% | 78.2% | 84.2% | 80.4% |
| Catalyst efficiency (g poly/g catalyst) | 538,200 | 565,500 | 608,600 | 580,923 |
| Ethylene content (wt %) | 90.8 | 87.1 | 85.2 | 87.2 |
| Density (g/cm$^3$) | 0.9215 | — | — | — |
| Tc (° C.) | 94.4 | 86.7 | 83.5 | 87.4 |
| Tm (° C.) | 110.7 | 103.2 | 98.4 | 102.4 |
| Heat of fusion (J/g) | 136.9 | 118.2 | 101.7 | 116.1 |
| Mn DRI (g/mol) | 12,180 | 12,029 | 16,650 | 9,559 |
| Mw DRI (g/mol) | 90,693 | 44,213 | 87,965 | 76,219 |
| Mz DRI (g/mol) | 463,907 | 85,791 | 276,492 | 284,371 |
| Mn LS (g/mol) | 27,617 | 14,563 | 24,995 | 21,955 |
| Mw LS (g/mol) | 174,260 | 36,154 | 95,374 | 100,539 |
| Mz LS (g/mol) | 1,434,765 | 78,146 | 315,225 | 579,821 |

TABLE 1-continued

DTP produced in a solution process

| | DTP No. | | | |
|---|---|---|---|---|
| Catalyst | 1<br>Catalyst A | 2<br>Catalyst A | 3<br>Catalyst A | 4<br>Catalyst A |
| $g'_{vis}$ | 0.513 | 0.88 | 0.718 | 0.696 |
| $I_2$ (dg/min) | <0.1 | 81.6 | 1.1 | 1.8 |
| $I_{21}$ (dg/min) | 29.4 | — | 58.9 | 93.6 |
| MIR | — | — | 53.6 | 50.9 |
| Complex viscosity @ 398 rad/sec (Pa · s) | 232 | 89 | 376 | 265 |
| Complex viscosity @ 100 rad/sec (Pa · s) | 521.5 | 134.2 | 842.8 | 569.6 |
| Complex viscosity @ 0.1 rad/sec (Pa · s) | 20162.0 | 173.8 | 16847.5 | 9893.2 |
| Complex viscosity @ 0.01 rad/sec (Pa · s) | 43,128 | 2,497 | 22,262 | 12,204 |
| Phase angle at G* = 100,000 Pa (degree) | — | — | 38.2 | 39.8 |

TABLE 2

DTP produced in a solution process (continued)

| | DTP No. | | | | |
|---|---|---|---|---|---|
| Catalyst | 5<br>Catalyst A | 6<br>Catalyst A | 7<br>Catalyst B | 8<br>Catalyst B | 9<br>Catalyst B |
| Reaction temperature (° C.) | 130 | 130 | 130 | 130 | 130 |
| Isohexane flow rate (g/min) | 52.24 | 52.24 | 54.5 | 54.5 | 54.5 |
| ethylene feed rate (slpm) | 8 | 8 | 8 | 8 | 8 |
| 1-hexene feed rate (g/min) | 2.5 | 2 | 4 | 3 | 3 |
| 1,9-decadiene feed rate (ml/min) | 0.0488 | 0.0488 | 0.024 | 0.0488 | 0.0488 |
| Yield (gram/min) | 9.85 | 9.81 | 9.64 | 10.58 | 9.78 |
| Conversion (%) | 85.3% | 88.8% | 73.8% | 88% | 81.2 |
| Catalyst efficiency (g poly/g catalyst) | 537,182 | 535,000 | 825,905 | 906,944 | 1,048,784 |
| Ethylene content (wt %) | 87.2 | 88.7 | 85.1 | 83.8 | 87.4 |
| Density (g/cm$^3$) | — | — | — | — | 0.9076 |
| Tc (° C.) | 88.3 | 91.7 | 75.4 | 80.9 | 83.4 |
| Tm (° C.) | 103.7 | 106.7 | 95.0 | 97.7 | 102.7 |
| Heat of fusion (J/g) | 112.8 | 123.0 | 97.7 | 100.0 | 114.2 |
| Mn DRI (g/mol) | 17,728 | 10,786 | 25,011 | 25,347 | 31,746 |
| Mw DRI (g/mol) | 101,280 | 51,964 | 87,916 | 128,813 | 181,281 |
| Mz DRI (g/mol) | 433,198 | 105,012 | 243,019 | 504,459 | 729,567 |
| Mn LS (g/mol) | 21,483 | 22,247 | 27,775 | 39,460 | 71,110 |
| Mw LS (g/mol) | 174,433 | 55,077 | 105,137 | 225,011 | 390,378 |
| Mz LS (g/mol) | 1,336,719 | 116,596 | 398,179 | 1,350,319 | 2,248,953 |
| $g'_{vis}$ | 0.593 | 0.853 | 0.739 | 0.574 | 0.43 |
| $I_2$ (dg/min) | 12.2 | 6.4 | 0.4 | <0.1 | <0.1 |
| $I_{21}$ (dg/min) | 447.8 | 265.8 | 22.3 | 12.2 | 2.1 |
| MIR | 36.8 | 41.5 | 59.5 | — | — |
| Complex viscosity @ 398 rad/sec (Pa · s) | 193 | 256 | 549.3 | — | — |
| Complex viscosity @ 100 rad/sec (Pa · s) | 352.6 | 506.5 | 1265 | 899.1 | 1304 |
| Complex viscosity @ 0.1 rad/sec (Pa · s) | 1214.2 | 2494.0 | 43220 | 37949 | 122420 |
| Complex viscosity @ 0.01 rad/sec (Pa · s) | 1,540 | 1,810 | 75,288 | 81,589 | 436,290 |
| Phase angle at G* = 100,000 Pa (degree) | — | 44.0 | 36.5 | 33 | 28 |

The complex viscosity of the DTP polymer produced in Examples 1 to 6 was measured at a temperature of 190° C. over an angular frequency ranging from 0.01 to 398 rad/s. Significant shear thinning was observed. The ratio of the complex viscosity at a frequency of 0.01 rad/s to the complex viscosity at a frequency of 398 rad/s was 186, 59.2, and 8 for materials produced in Examples 1, 3, and 5 respectively. The shear thinning slope, the slope of the log (complex viscosity) versus log (frequency) curve, for material produced in Examples 1, 3, and 5 were −0.494, −0.385, and −0.196, respectively. Significant shear thinning was also reflected in the high $I_{21}/I_2$ values. The shear thinning for material produced in Examples 1 to 11 are greater than $53.9*I_2^{(-0.74)}$, where $I_2$ is the melt index (190° C., 2.16 kg).

The transient extensional viscosity of the DTP produced in Example 1 was measured at a temperature of 150° C. and a strain rate of 1 sec$^{-1}$. A strain-hardening ratio of 7.3 was observed.

A melt strength value of 36.6 cN was observed for the DTP produced in Example 5.

Stress-Crack Resistant Articles

The DTP used in the inventive article examples was a terpolymer of ethylene/hexene/1,9-decadiene and was made in a solution process as described above, except that a 1-liter autoclave reactor was used. The process condition and some properties are listed in Table 3 below. 3 wt % of the DTP was blended with Enable 3505 (Available from ExxonMobil Chemical Co.) for evaluation of geomembrane applications. The GPC curves for the blend and neat Enable 3505 are shown in FIG. 1. The blend has a higher fraction at the high molecular side as compared with that for neat Enable 3505.

TABLE 3

Diene Terpolymer Reaction Conditions and Properties

| Parameter | value |
|---|---|
| Catalyst | Catalyst B |
| Polymerization temperature (° C.) | 130 |
| Ethylene feed rate (SLPM) | 8 |
| Isohexane flow rate (g/min) | 54 |
| 1-hexene feed rate (g/min) | 1.8 |
| 1,9-decadiene feed rate (ml/min) | 0.049 |
| Isohexane feed rate (g/min) | 54 |
| Yield (gram/min) | 9.51 |
| Conversion (%) | 87.70% |
| Catalyst efficiency (g poly/g catalyst) | 815,349 |
| 1-hexene content (wt %) | 10.8 |
| Density (g/cm$^3$) | 0.9145 |
| Tc (° C.) | 90.5 |
| Tm (° C.) | 113.3 |
| Heat of fusion (J/g) | 123 |
| Mn DRI (g/mol) | 32,033 |
| Mw DRI (g/mol) | 197,817 |
| Mz DRI (g/mol) | 734,947 |
| Mn LS (g/mol) | 80,867 |
| Mw LS (g/mol) | 397,764 |
| Mz LS (g/mol) | 2,088,097 |
| g'$_{vis}$ | 0.5 |
| I$_2$ (dg/min) | <0.1 |
| I$_{21}$ (dg/min) | 0.04 |
| Complex viscosity at 0.1 rad/sec (Pa s) | 481,000 |
| Complex viscosity at 100 rad/sec (Pa s) | 2,218 |

Figure 2:
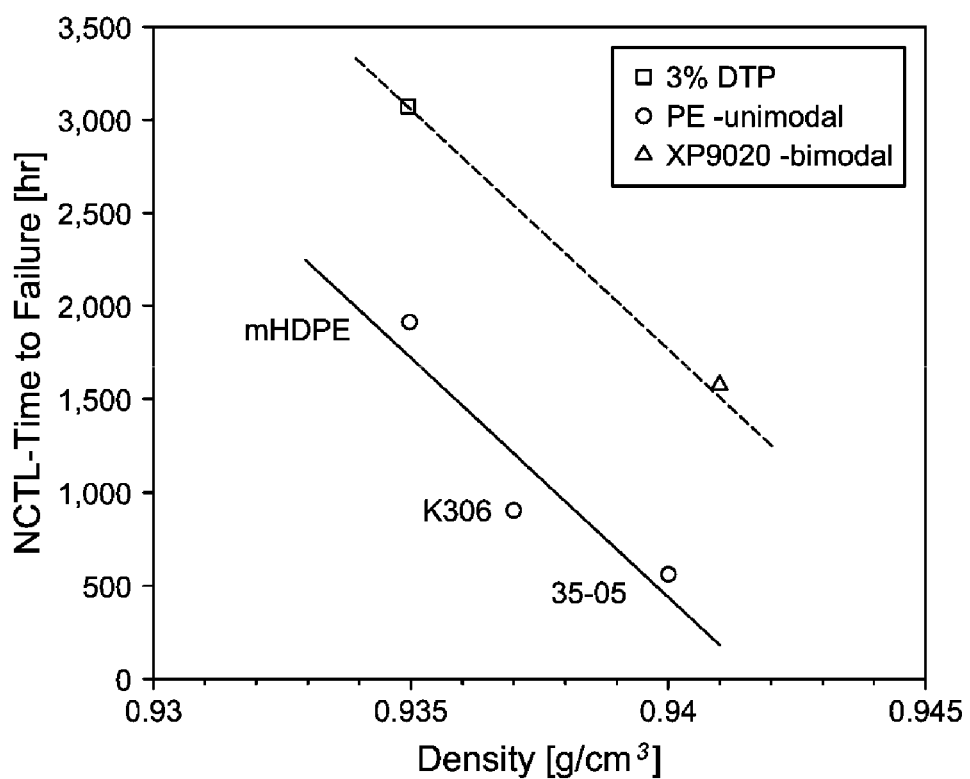
FIG. 2 is a graphical representation of SP-NCTL (Single Point Notched Constant Tensile Load) Time to Failure vs. Density data for comparative polyethylenes and inventive blends.

To test the properties of the inventive high stress-crack resistant articles, 3% of the inventive DTP and Enable 3505 was compounded on a 1" Haake twin screw extruder. The typical extrusion condition is listed below in Table 4. A Single Point Notched Constant Tensile Load (SP-NCTL; ASTM D5397) test for stress crack resistance was conducted at CTT Group (St-Hyacinthe, Quebec, Canada), results of which are shown in FIG. 2. The data of time to failure from the SP-NCTL test is plotted in FIG. 2. The control sample of Enable 3505 (density of 0.935 g/cm$^3$) had all failed with an average failure time of 2000 hours. The Enable 3505 with 3% DTP did not show any failures even at 3000 hours, improving the NCTL failure time by more than 50%.

TABLE 4

Compounding Extrusion Condition

| Extrusion Condition | value |
|---|---|
| Zone 1 (° C.) | 180 |
| Zone 2 (° C.) | 185 |
| Zone 3 (° C.) | 190 |
| Die (Zone 5) (° C.) | 195 |
| Extruder Speed (rpm) | 55 |

NCTL Testing.

Notched Constant Tensile Load (NCTL) Test is an ASTM D5397 test method to evaluate stress crack resistance of polyolefin. The pellets were compression molded into a plaque in order to provide type L dumbbell bars. A tensile test (ASTM D638) was conducted to determine the yield stress of sample. Afterwards, five fresh notched type L dumbbell bars were mounted into a constant stress loading apparatus. The apparatus contained 10% Igepal CO-630 water solution. For the single point NCTL test (SP-NCTL) the notched bars were subjected to a content stress load equivalent to 30% yield stress. The average value of the times for all five samples to break is called "failure time" in the unit of hour.

Comparative Resin Information:

Enable 3505: metallocene linear-MDPE, 0.935 g/cm$^3$ density, I$_2$ is 0.5 g/10 min, I$_{21}$ of 25 g/10 min; unimodal and narrow MWD, crystallization temperature of 112° C.;

Borstar™ FB1350: LMDPE: 0.935 g/cm$^3$ density; I$_5$ is 0.6 g/10 min; I$_{21}$ is 15 g/10 min; bimodal and broad MWD;

Chevron Phillips Chemical Marlex™ K306: LMDPE: 0.937 g/cm$^3$ density; I$_{21}$ is 12 g/10 min; unimodal and broad MWD;

DaelimPoly XP9020: metallocene bimodal HDPE having a density of 0.941 g/cm$^3$, a MWD (Mw/Mn) of 20.2, and I$_{21}$ of 10 g/10 min, an Mz of 625,000 g/10 min, and an Mw of 183,000 g/10 min; and mHDPE: metallocene linear PE, 0.940 g/cm$^3$ density, I$_2$ of 0.2 g/10 min, I$_{21}$ of 11.6 g/10 min, crystallization temperature of 115° C.

Melt Strength.

"Melt strength" is defined as the force required to draw a molten polymer extrudate at a rate of 12 mm/s$^2$ and at an extrusion temperature of 190° C. until breakage of the extrudate whereby the force is applied by take up rollers. The polymer is extruded at a velocity of 0.33 mm/s through an annular die of 2 mm diameter and 30 mm length. Melt strength values reported herein are determined using a Gottfert Rheotens tester and are reported in centi-Newtons (cN). Additional experimental parameters for determining the melt strength are listed in the table below. For the measurements of melt strength, the resins were stabilized with 500 ppm of Irganox 1076 and 1500 ppm of Irgafos168.

| Melt Strength test parameters | |
|---|---|
| Acceleration | 12 mm/s$^2$ |
| Temperature | 190° C. |
| Piston diameter | 12 mm |
| Piston speed | 0.178 mm/s |
| Die diameter | 2 mm |
| Die length | 30 mm |
| Shear rate at the die | 40.05 s$^{-1}$ |
| Strand length | 100.0 mm |
| Vo (velocity at die exit) | 10.0 mm/s |

Figure 3:
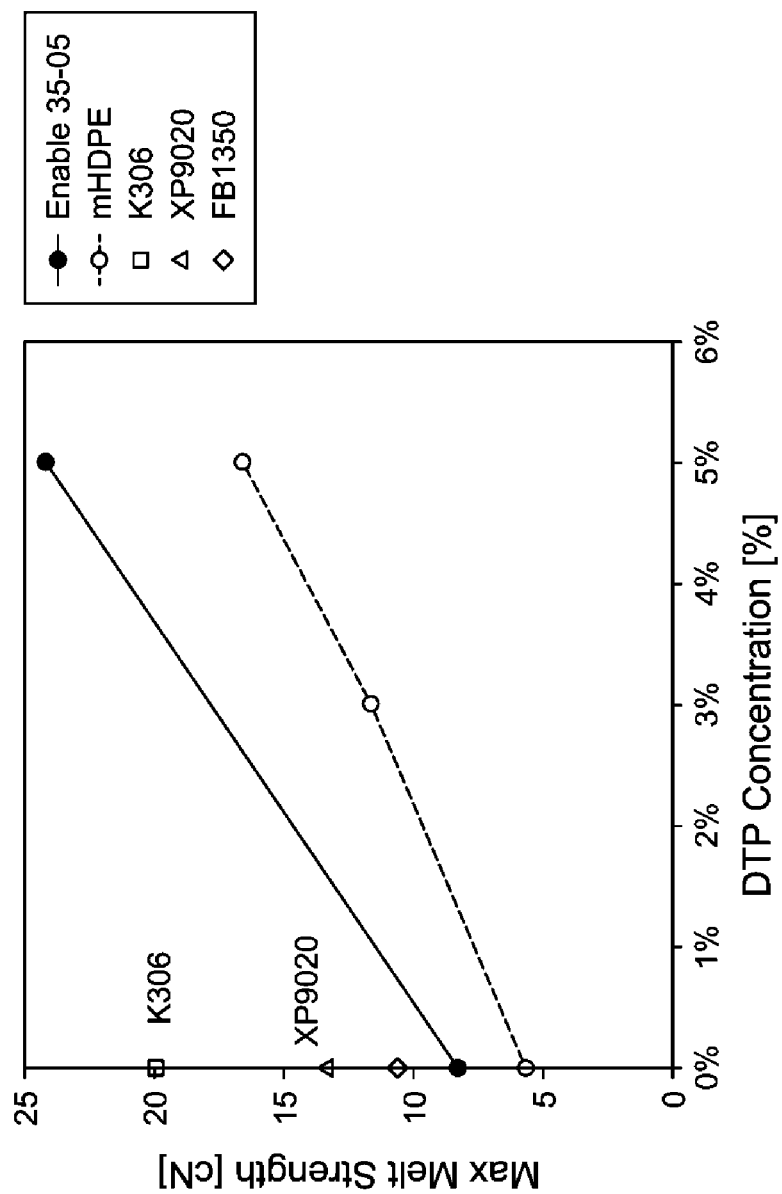
FIG. 3 is a graphical representation of the melt strength of the inventive blends of DTP and linear polyethylene.
Figure 4:
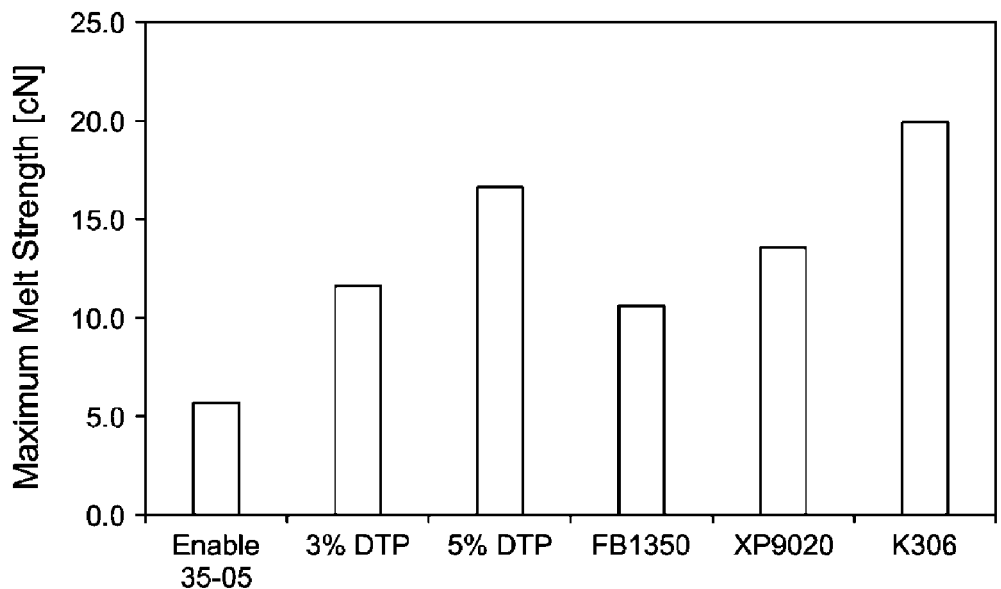
FIG. 4 is a graphical representation of the effect of DTP Addition on Melt Strength Enhancement for Enable 3505.
Figure 5:
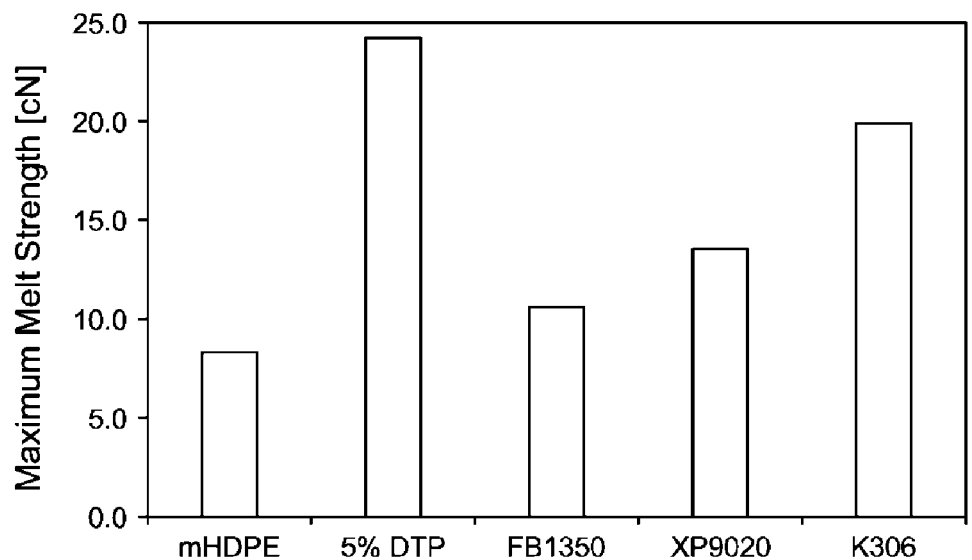
FIG. 5 is a graphical representation of the effect of DTP Addition on Melt Strength Enhancement for a mHDPE.

The maximum melt strength for DTP blend with Enable 3505 and mHDPE is shown in FIGS. 3, 4 and 5, and Table 5 below.

TABLE 5

Maximum Melt Strength

| | DTF % | Max MS, [cN] |
|---|---|---|
| Enable 3505 | 0 | 5.66 |
| Enable 3505 | 1% | 5.53 |
| Enable 3505 | 3% | 11.6 |
| Enable 3505 | 5% | 16.58 |
| MHDPE | 0% | 8.28 |
| MHDPE | 5% | 24.2 |
| K306 | 0% | 19.9 |
| FB1350 | 0% | 10.6 |
| XP9020 | 0% | 13.5 |

For Enable 3505, the maximum melt strength increases 105% and 193%, with addition of 3% and 5% DTP respectively.

For mHDPE, the maximum melt strength increases 192% with addition of 5% DTP.

Physical Properties.

Key physical properties—tensile, tear and puncture are almost same for both pure Enable 3505 and 3% DTP blend. The results are presented in Table 6.

TABLE 6

Physical Properties of Blend and Base Resin

| parameter | unit | method | Enable 3505 | 3% DTP + Enable 3505 |
|---|---|---|---|---|
| Tensile | | | | |
| Strength at Yield | kN/m | ASMT D6693 | 27.7 | 26.7 |
| Strength at Yield | lb/in | ASMT D6693 | 158 | 153 |
| Elongation at Yield | % | ASMT D6693 | 16 | 17 |
| Strength at Break | kN/m | ASMT D6693 | 49.9 | 51.0 |
| Strength at Break | lb/in | ASMT D6693 | 285 | 291 |
| Elongation at Break | % | ASMT D6693 | 784 | 788 |
| Tear Resistance | | | | |
| Tear Strength | N | ASTM D1004 | 223 | 223 |
| Maximum Extension | mm | ASTM D1004 | 19 | 19 |
| Puncture Resistance | | | | |
| Puncture Resistance | N | ASTM D4833 | 570.0 | 574.9 |
| Puncture Resistance | lb | ASTM D4833 | 128.1 | 129.2 |
| SP-NCTL | hr | ASTM D5397 | 1,918 | >3,000 |

The high stress-crack resistant compositions described herein are made using the DTP and a linear polyethylene. A desirable linear polyethylene is mHDPE having the following features in Table 7.

TABLE 7

Properties of an exemplary linear polyethylene (Enable 3505) suitable for inventive composition

| parameter | unit | conditions | values |
|---|---|---|---|
| Density | g/cm³ | | 0.935 |
| $I_2$ | g/10 min | | 0.5 |
| $I_{21}$ | g/10 min | | 25.0 |
| MIR ($I_{21}/I_2$) | | | 54 |
| Melting Point Temperature | °C. | 10° C./min | 123.2 |
| Crystallization Temperature | °C. | 10° C./min | 112.0 |

TABLE 7-continued

Properties of an exemplary linear polyethylene (Enable 3505) suitable for inventive composition

| parameter | unit | conditions | values |
|---|---|---|---|
| Heat of Fusion | J/g | 10° C./min | 164.4 |
| Mn | g/mol | GPC: DRI Analysis | 26,700 |
| Mw | g/mol | GPC: MALLS/3D | 110,000 |
| Mz | g/mol | GPC: MALLS/3D | 248,000 |
| Mw/Mn | — | | 4.1 |
| g' | — | | 0.996 |

TABLE 8

NCTL Data

| | Density, [g/cm³] | NCTL, [hr] |
|---|---|---|
| Enable 3505 | 0.935 | 1919 |
| Marlex K306 | 0.937 | 900 |
| mHDPE | 0.94 | 563 |
| 3% DTP + Enable 3505 | 0.935 | 3070 |
| XP9020 -bimodal | 0.941 | 1625 |

Addition of 3 wt % DTP to form the inventive blend enhances the melt strength while maintains the mechanical properties such as tensile, elongation and puncture, etc. The 3 wt % DTP addition significantly improves the stress cracking resistance performances measured by the notched constant tensile load (NCTL) test method, as seen in the data in Table 8. The failure time of the NCTL testing is increased from 1,919 hrs for pure Enable 3505 to greater than 3,070 hrs for 3 wt % DTP blend.

Now, having described the various features of the DTP, the linear polyethylenes, and blends of these to form a crack-resistant article, described here in numbered paragraphs is:

P1. A crack-resistant article comprising (or consisting essentially of) a blend of a diene terpolymer and a linear polyethylene, the diene terpolymer comprising from 0.01 wt % to 10.0 wt % diene derived units, and 1.0 wt % to 20 wt % of $C_4$ to $C_{10}$ α-olefin derived units based on the weight of the diene terpolymer, wherein the diene terpolymer has:
  a) a $g'_{vis}$ of less than 0.90;
  b) an Mw within a range of from 100,000 g/mol to 500,000 g/mol;
  c) an Mw/Mn within the range of from 3.5 to 12; and
  d) an Mz/Mn of greater than 7.0.

P2. The article of claim 1, wherein the diene terpolymer comprises (or consists of) ethylene derived units and diene derived units, most preferably alpha-omega diene derived units; wherein the diene terpolymer also comprises within the range from 1.0 or 2.0 or 5.0 wt % to 12 or 16 or 20 wt % of a $C_4$ to $C_{10}$ α-olefin derived units based on the weight of the diene terpolymer.

P3. The article of paragraph 1, wherein the diene terpolymer has a shear thinning ratio of 40 or more.

P4. The article of any one of the previous paragraphs, wherein the diene terpolymer has a heat of fusion ($H_f$) within the range of from 70 J/g to 140 J/g.

P5. The article of any one of the previous paragraphs, wherein the diene terpolymer has a melting point temperature ($T_m$) within the range of from 95° C. to 135° C.

P6. The article of any one of the previous paragraphs, wherein the diene terpolymer has an Mz within a range of from 500,000 g/mol to 3,000,000 g/mol.

P7. The article of any one of the previous paragraphs, wherein the diene terpolymer has a phase angle at complex shear modulus G*=100,000 Pa of 40° or less, or within the range of from 10° to 35°.

P8. The article of any one of the previous paragraphs, wherein the diene is selected from the group consisting of: 1,4-pentadiene, 1,5-hexadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, tetrahydroindene, norbornadiene also known as bicyclo-(2.2.1)-hepta-2,5-diene, dicyclopentadiene, 5-vinyl-2-norbornene, 1,4-cyclohexadiene, 1,5-cyclooctadiene, 1,7-cyclododecadiene, and combinations thereof.

P9. The article of any one of the previous paragraphs, wherein the diene terpolymer has a density within the range of from 0.890 or 0.905 or 0.910 or 0.915 g/cm$^3$ to 0.920 or 0.925 g/cm$^3$.

P10. The article of any one of the previous paragraphs, wherein the linear polyethylene has a g'$_{vis}$ of greater than 0.90; and a density within the range of from 0.925 g/cm$^3$ to 0.950 g/cm$^3$.

P11. The article of any one of the previous paragraphs, wherein the linear polyethylene has an I$_2$ within the range of from 0.05 g/10 min to 2.0 g/10 min, and I$_{21}$ within the range of from 8 g/10 min to 36 g/10 min.

P12. The article of any one of the previous paragraphs, wherein the linear polyethylene has an Mw/Mn within the range of from 3.0 to 6.0.

P13. The article of any one of the previous paragraphs, wherein the linear polyethylene has an Mz (LS) within a range of from 150,000 g/mole to 800,000 g/mole.

P14. The article of any one of the previous paragraphs, wherein the linear polyethylene has an Mw (LS) within a range of from 80,000 g/mole to 300,000 g/mole.

P15. The article of any one of the previous paragraphs, wherein the linear polyethylene has a Heat of Fusion (H$_f$) within a range of from 140 J/g to 200 J/g.

P16. The article of any one of the previous paragraphs, wherein the linear polyethylene has a melting point temperature within the range of from 118° C. to 128° C.

P17. The article of any one of the previous paragraphs, wherein the blend comprises within the range of from 0.1 to 8.0 wt % of the diene terpolymer.

P18. The article of any one of the previous paragraphs, having a specific gravity within a range of from 0.930 to 0.950 g/cm$^3$.

P19. The article of any one of the previous paragraphs, having an Elongation at Break (ASMT D6693) of greater than 500%.

P20. The article of any one of the previous paragraphs, having a stress crack resistance (NCTL) of greater than 1800 hours.

P21. The article of any one of the previous paragraphs, having a Melt Strength within the range of from 10 cN to 40 cN.

P22. The article of any one of the previous paragraphs, having a Strength at Yield of greater than 20 kN/m.

P23. The article of any one of the previous paragraphs, having a Tear Strength of greater than 200 or 220 N.

P24. A geomembrane comprising the article of any one of the previous paragraphs.

P25. A pipe, molded, or thermoformed article comprising the article of any one of the previous paragraphs.

Also disclosed herein is the use of the DTP in a blend with a linear polyethylene to form a crack-resistant article.

For all jurisdictions in which the doctrine of "incorporation by reference" applies, all of the test methods, patent publications, patents and reference articles are hereby incorporated by reference either in their entirety or for the relevant portion for which they are referenced.

The invention claimed is:

1. An article comprising a blend of a diene terpolymer and a polyethylene, the diene terpolymer comprising units derived from ethylene, from 1.0 wt % to 10.0 wt % of units derived from a diene, and units derived from a C$_4$ to C$_{10}$ α-olefin based on a weight of the diene terpolymer, wherein the diene is selected from the group consisting of: 1,4-pentadiene, 1,5-hexadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and combinations thereof, and wherein the diene terpolymer has:
   a) a g'$_{vis}$ of less than 0.90;
   b) an Mw within a range of from 100,000 g/mol to 500,000 g/mol;
   c) an Mw/Mn within the range of from 3.5 to 12;
   d) an Mz/Mn of greater than 7.0;
   e) an Mz within a range of from 1,000,000 g/mol to 3,000,000 g/mol, and
   f) a melting point temperature (T$_m$) of 97.7° C. to 110.7° C., wherein the Mw, Mn, and Mz values are measured with a size-exclusion chromatograph equipped with a differential refractive index detector, a light scattering detector, and a viscometer;
   wherein the polyethylene has a g'$_{vis}$ of greater than 0.90, a density within the range of from 0.925 g/cm$^3$ to 0.950 g/cm, an I$_2$ (190° C./2.16 kg) within the range of from 0.05 g/10 min to 2.0 g/10 min, and an I$_{21}$ (190° C./21.6 kg) within the range of from 8 g/10 min to 36 g/10 min.

2. The article of claim 1, wherein the diene terpolymer has a shear thinning ratio of 40 or more.

3. The article of claim 1, wherein the diene terpolymer has a heat of fusion (H$_f$) within the range of from 70 J/g to 140 J/g.

4. The article of claim 1, wherein the diene is selected from the group consisting of 1,4-pentadiene, 1,9-decadiene, and a combination thereof.

5. The article of claim 1, wherein the polyethylene has an Mw/Mn within the range of from 3.0 to 6.0.

6. The article of claim 1, wherein the polyethylene has a heat of fusion (H$_f$) within a range of from 140 J/g to 200 J/g.

7. The article of claim 1, wherein the polyethylene has a melting point temperature within the range of from 118° C. to 128° C.

8. A geomembrane comprising the article of claim 1.

9. A pipe, molded, or thermoformed article comprising the article of claim 1.

10. The article of claim 1, wherein the diene comprises 1,4-pentadiene.

11. The article of claim 1, wherein the diene terpolymer comprises at least 80 mol % of the units derived from ethylene.

12. The article of claim 1, wherein the C$_4$ to C$_{10}$ α-olefin comprises 1-hexene, 1-octene, or a combination thereof.

13. The article of claim 1, wherein the diene comprises 1,9-decadiene.

14. The article of claim 1, wherein the diene terpolymer comprises 5 wt % or less of xylene insoluble material.

15. The article of claim 1, wherein the diene terpolymer is essentially gel free.

16. The article of claim 1, wherein:
the diene terpolymer comprises at least 80 mol % of the units derived from ethylene,
the $C_4$ to $C_{10}$ α-olefin a comprises 1-hexene, 1-octene, or a combination thereof,
the diene comprises 1,9-decadiene, and
the diene terpolymer comprises 5 wt % or less of xylene insoluble material.

17. The article of claim 1, wherein the diene terpolymer consists essentially of at least 80 mol % of the units derived from ethylene, the units derived from the $C_4$ to $C_{10}$ α-olefin, and the units derived from the diene, wherein:
the $C_4$ to $C_{10}$ α-olefin a comprises 1-hexene, 1-octene, or a combination thereof,
the diene comprises 1,9-decadiene, and
the diene terpolymer comprises 5 wt % or less of xylene insoluble material.

18. The article of claim 1, wherein the diene terpolymer consists essentially of at least 80 mol % of the units derived from ethylene, the units derived from the $C_4$ to $C_{10}$ α-olefin, and the units derived from the diene, wherein:
the $C_4$ to $C_{10}$ α-olefin consists essentially of 1-octene, 1-hexene, or a mixture thereof,
the diene consists essentially of 1,9-decadiene, and
the diene terpolymer comprises 5 wt % or less of xylene insoluble material.

19. The article of claim 1, wherein the diene terpolymer consists essentially of at least 80 mol % of the units derived from ethylene, the units derived from the $C_4$ to $C_{10}$ α-olefin, and the units derived from the diene, wherein:
the $C_4$ to $C_{10}$ α-olefin consists essentially of 1-octene,
the diene consists essentially of 1,9-decadiene, and
the diene terpolymer comprises 5 wt % or less of xylene insoluble material.

\* \* \* \* \*